United States Patent
Omata et al.

(10) Patent No.: US 6,469,403 B2
(45) Date of Patent: Oct. 22, 2002

(54) CONTROL APPARATUS FOR HYBRID VEHICLE

(75) Inventors: Yoshiaki Omata, Shizuoka-ken (JP); Kazuhiko Morimoto, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 8 days.

(21) Appl. No.: 09/826,991

(22) Filed: Apr. 5, 2001

(65) Prior Publication Data

US 2001/0028171 A1 Oct. 11, 2001

(30) Foreign Application Priority Data

Apr. 6, 2000  (JP) ........................................ 2000-104370

(51) Int. Cl.$^7$ ................................................ F02N 11/06
(52) U.S. Cl. .......................... 290/40 C; 290/45; 290/50
(58) Field of Search ................................ 290/40 C, 45, 290/50

(56) References Cited

U.S. PATENT DOCUMENTS

| | | | | |
|---|---|---|---|---|
| 3,753,059 A | * | 8/1973 | Berman | 318/139 |
| 5,081,365 A | * | 1/1992 | Field et al. | 290/45 |
| 6,019,183 A | * | 2/2000 | Shimasaki et al. | 180/165 |
| 6,116,368 A | * | 9/2000 | Lyons et al. | 180/165 |
| 6,124,690 A | * | 9/2000 | Yano et al. | 318/376 |
| 6,127,806 A | * | 10/2000 | Tanjo et al. | 320/132 |
| 6,316,842 B1 | * | 11/2001 | Kuroda et al. | 290/40 C |
| 6,373,206 B1 | * | 4/2002 | Morimoto et al. | 318/135 |

FOREIGN PATENT DOCUMENTS

| | | | |
|---|---|---|---|
| EP | 0906847 A2 | * | 4/1999 |
| JP | 11-136808 | | 5/1999 |
| JP | 11-332017 | | 11/1999 |
| JP | 200186603 A | * | 3/2001 |

* cited by examiner

*Primary Examiner*—Joseph Waks
(74) *Attorney, Agent, or Firm*—Flynn, Thiel, Boutell & Tanis, P.C.

(57) ABSTRACT

A motor control apparatus for a hybrid vehicle includes a controller having a normal control mode which detects the open-circuit voltage of a battery at driving stop of the electric motor and which sets voltage parameters according to the open-circuit voltage. In addition, the controller has an electric discharge control mode which sets a battery voltage parameter at a fixed value when the battery open-circuit voltage is higher than for normal control mode. As a result, in the control apparatus for a hybrid vehicle, over-charge and over-electric discharge of the battery is prevented. By controlled charging and electric discharging, battery life is extended. Battery administration is performed by a simplified system of hardware and software.

5 Claims, 13 Drawing Sheets

MAIN BATTERY ADMINISTERING PARAMETER DETERMINATION PROCESSING

MAIN BATTERY ADMINISTERING PARAMETER DETERMINATION PROCESSING

FIG. 9

DRIVING TABLE

TORQUE VALUE LIMIT COEFFICIENT

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| DRIVING LIMIT COEFFICIENT | 0 | 0 | 0 | 0.1 | 0.2 | 0.4 | 0.6 | 0.8 | 1.0 | 1.0 | 1.0 | 1.0 | 1.0 | 1.0 | 1.0 |

FIG. 10

POWER-GENERATING TABLE

DRIVIE TORQUE ORDER LIMIT COEFFICIENT

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| RECHARGING LIMIT COEFFICIENT | 7.0 | 7.0 | 7.0 | 5.0 | 4.0 | 3.0 | 2.0 | 1.5 | 1.0 | 1.0 | 0.5 | 0 | 0 | 0 | 0 |

UPPER VOLTAGE TABLE

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| UPPER VOLTAGE | 230 | 230 | 230 | 230 | 230 | 220 | 215 | 210 | 210 | 210 | 210 | 205 | 205 | 205 | 205 |

LOWER VOLTAGE TABLE

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| LOWER VOLTAGE | 185 | 185 | 188 | 188 | 185 | 185 | 185 | 180 | 180 | 180 | 180 | 180 | 180 | 175 | 175 |

VOLTAGE LIMIT: REVISION METHOD

CONTROL APPARATUS FOR HYBRID VEHICLE

BACKGROUND OF THE INVENTION

This invention relates to a control apparatus for a hybrid vehicle having an electric motor directly connected to an engine and having both driving and power-generating functions. A main battery supplies a driving electric power to the motor and is charged by power-generating electricity from the motor. The control apparatus controls the motor functions and administers the battery.

BACKGROUND OF THE INVENTION

Some motor vehicles are of a type commonly called hybrid vehicles having an internal combustion engine which is driven by combustion of fuel and an electric motor (hereafter described as "motor") driven by electric energy, wherein the motor is directly connected to the engine and has a power-generating function. The hybrid vehicle further includes an engine control means for controlling a running state of the engine and motor control means for controlling an operating state of the motor. The engine control means and the motor control means detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, low values of detrimental components in exhaust gases, and power performance). The apparatus includes a main battery which supplies drive electricity to the motor and is charged by power-generation of the motor. A required voltage for the main battery must be maintained to enable suitable driving power-generation/driving prohibition for the motor. This apparatus administers control of the battery.

One such example of a control apparatus for a hybrid vehicle is disclosed in published Japanese Application Laid-Open No. 11-136808. In the hybrid vehicle of this disclosure, the control apparatus has a battery state distinguishing means and a power-generation electricity determining means which prevent over-charge and over-electric discharge of a main battery, and which control power-generating of electricity to satisfy essential power performance requirements of a vehicle.

A control apparatus of a traditional hybrid vehicle maintains a reasonable charge state in a battery. For this purpose, the control apparatus detects various parameters such as water temperature, electric current, voltage and so on, and decides how to control a motor from the detected results. Accordingly, there is a problem or inconvenience in that a system to administer the battery becomes complicated and expensive in hardware and software.

In order to obviate or minimize the above problem, the present invention provides a control apparatus for a hybrid vehicle, which includes an electric motor directly connected to an engine and having both driving and power-generating functions, and a main battery which supplies driving electric power to the motor and is charged by power-generating electricity from the motor. A control means has a normal control mode which detects the battery open-circuit voltage of the battery at driving stop of the motor, and which sets voltage parameters according to the battery open-circuit voltage. In addition, the motor control means has an electric discharge control mode which sets a value of a battery voltage parameter to a fixed value when the battery open-circuit voltage is higher than values for the normal control mode.

In this invention, motor control means has a normal control mode which detects the battery open-circuit voltage of the main battery at driving stop of the motor and sets voltage parameters according to the battery open-circuit circuit voltage. In addition, the motor control means has an electric discharge control mode which sets a value of a battery voltage parameter to a fixed value when the battery open-circuit voltage is higher than those at normal control mode. Accordingly, the voltage parameter is set at a value to cause an electric discharge tendency (giving priority to drive of the motor). When a battery state is good, the motor is driven only for a voluntary time period until an electric discharge of fixed quantity is used. As a result, fuel efficiency is improved, and driving performance is improved by the effect of motor assist. In addition, over-charge and over-electric discharge of the main battery can be prevented. Accordingly, by reasonable charge and electric discharge, the life of main battery is extended. Furthermore, battery administration can be performed with a simplified system of hardware and software.

BRIEF DESCRIPTION OF THE DRAWINGS

FIG. 9 is a diagram of a search table representing driving torque value limit coefficients;

FIG. 10 is a diagram of a search table representing power-generating drive torque value limit coefficients;

DETAILED DESCRIPTION

Figure 1:
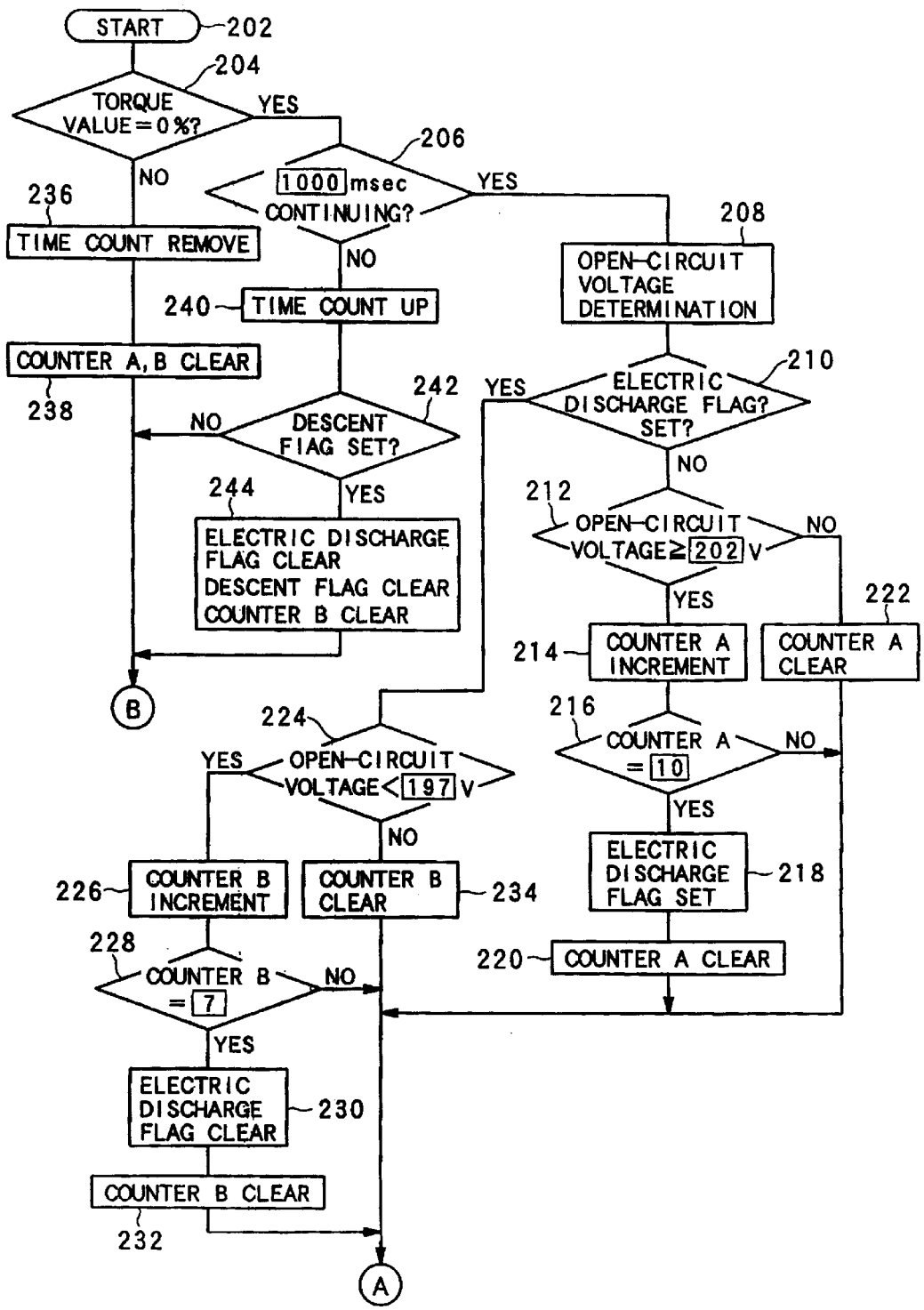
FIG. 1 is a control flowchart determining whether a control may be switched over to an electric discharge mode.

The present invention will now be described in specific detail with reference to FIGS. 1–16, which show embodiments according to the invention. FIG. 16 illustrates an engine 2 mounted on a hybrid vehicle (not shown); an electric motor 4 (hereafter described as "motor"); a clutch 6; a transmission 8; and control apparatus 10. The engine 2 drives by combustion of fuel. The motor 4 drives by electric energy and has a power-generating ability. The motor 4 is directly connected with a crank axis (not shown) of engine 2. The clutch 6 transmits and cuts off an engine output to a transmission 8 side.

The engine 2 includes an alternator 12 for power-generation, an air-compressor 14 for an air-conditioner, a starter motor 16 for starting up the vehicle, a sub-radiator 18, and an electrically driven water pump 20. The alternator 12 and the air compressor 14 are connected to the crank shaft by pulleys and belts (not shown). The starter motor 16 has a pinion gear engaging with a ring gear (not shown) and is connected to the flywheel (not shown) through a gear mechanism.

The engine 2 and the motor 4 are connected to a control means 22. The control means 22 includes an engine control means 24 and a motor control means 26. The engine control means 24 is linked to a sub-battery 28 (12V). The sub-battery 28 is coupled to the alternator 12, the starter motor 16, sub-radiator 18, and the electric water pump 20.

The motor 4 is connected to a motor control means 26, which is linked to a main battery 30 (192V). The main battery 30 is of a general lead storage battery type and supplies driving electric power to the motor 4, and is charged by generated electric power from the motor 4. The main battery 30 is connected to the motor 4 through the motor control means 26.

Figure 15:
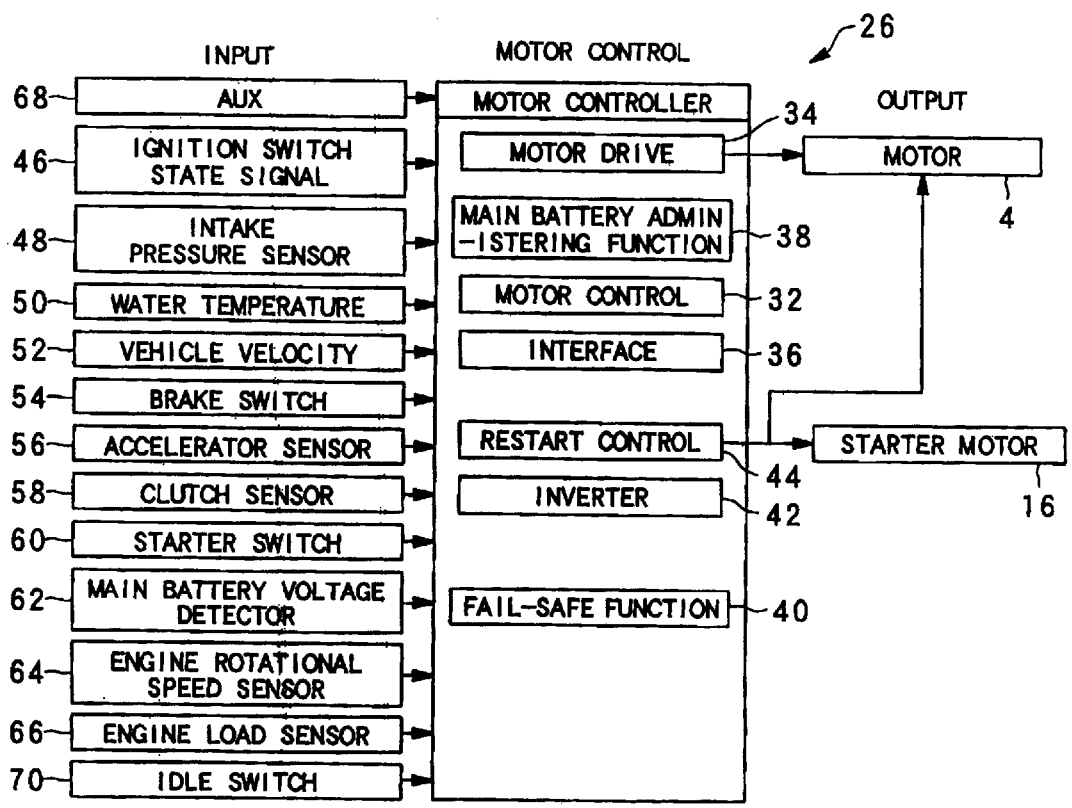
FIG. 15 is a block diagram showing sensors linking with a motor control means.
Figure 16:
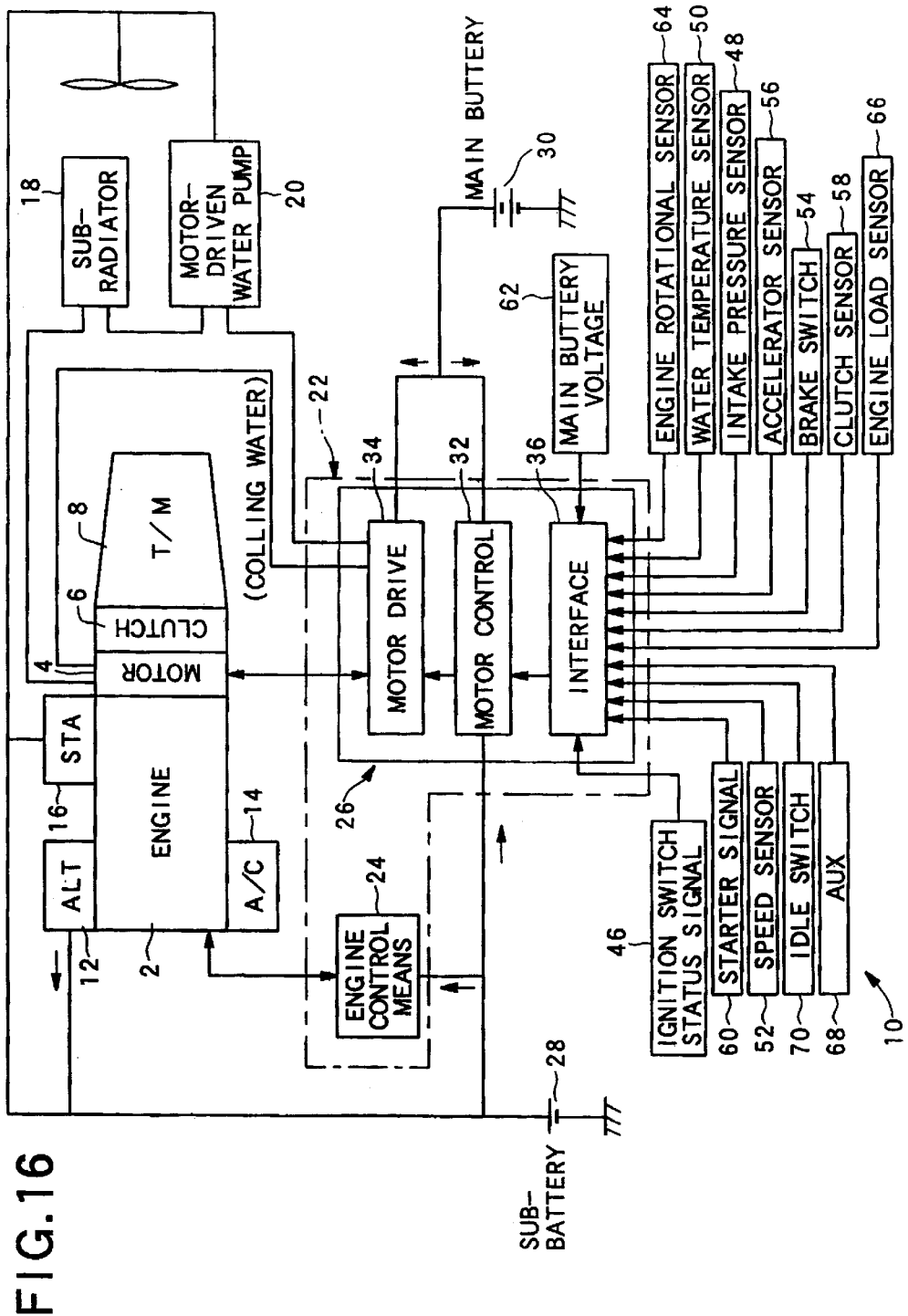
FIG. 16 is a diagram showing a system having a control apparatus.

The motor control means 26, as shown in FIGS. 15 and 16, includes a motor control section 32, a motor drive section 34, an input/output processing section (interface) 36, a main battery state administrating section 38, a fail-safe section 40, an inverter 42 and a restart-up control section 44.

The motor control means 26 is connected at an input side to: ignition switch 46; intake pressure sensor 48; water temperature sensor 50; vehicle velocity sensor 52; brake switch 54; accelerator sensor 56; clutch sensor 58; starter switch 60; main battery voltage detector 62; engine rotational speed sensor 64; engine load sensor 66; auxiliary (AUX) sensor 68; and idle switch 70. And the motor control means 26 is connected at an output side to: motor 4 linking with a motor drive section 34 and a restart-up control section 44; and starter motor 16 linking with restart-up control section 44.

The motor control means 26 supplies driving electric power to the motor 4, and inputs a main battery voltage signal from the main battery voltage detector 62 detecting a main battery voltage of a main battery 30 charged by generated electric power from the motor 4. Further, the motor control means 26 controls to govern a main battery mode with the main battery state administrating section 38.

Figure 14:
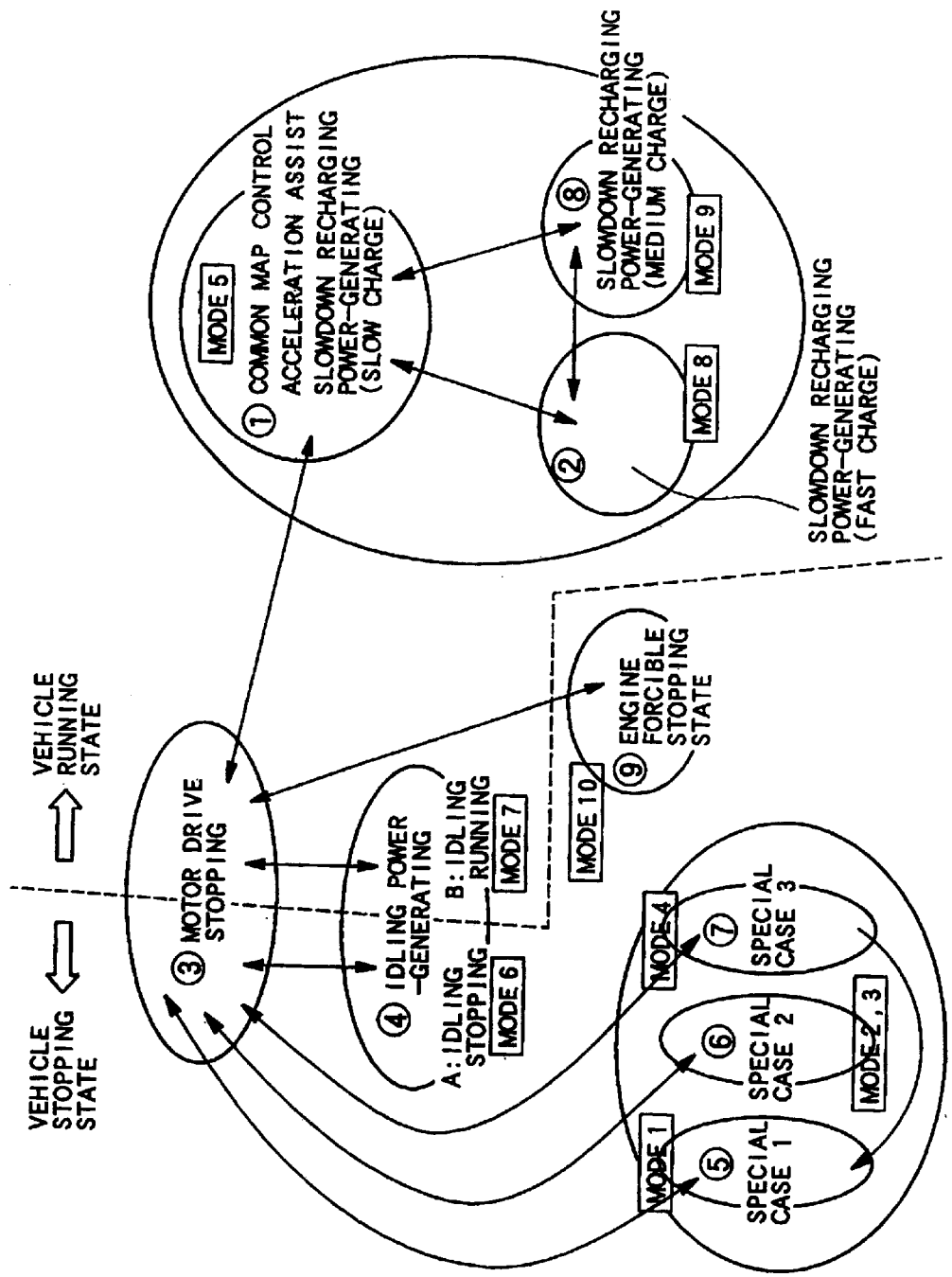
FIG. 14 is a schematic diagram showing a switchover of a control state for a motor assist system.

The control states of motor 4, as shown in FIG. 14, for example, are of the following nine kinds: first control state (1): common map control: an acceleration assist, a slowdown recharging power-generation (slow recharge), mode 5; second control state (2): a slowdown recharging power-generation (fast charge), mode 8; third control state (3): motor drive stop (state waiting whether each switchover condition is satisfied); fourth control state (4): idling power-generation, mode 6 (A: at stopping) and mode 7 (B: at running); fifth control state (5): special case 1 (start assist), mode 1; sixth control state (6): special case 2 (start-up assist), mode 2 (waiting), mode 3 (executing); seventh control state (7): special case 3 in special case control (engine rotational speed stabilization assist), mode 4; and eighth control state (8): slowdown recharging power generation (medium charge), mode 9; and ninth control state (9): engine forcible stop, mode 10.

A control state of the motor 4, as shown FIG. 14, switches over by a driving state of a vehicle. In other words, during each execution of first (1), second (2), fourth (4) and eighth (8) control states, when a switchover condition of fifth (5), sixth (6), seventh (7) and ninth (9) control states is satisfied, then first (1), second (2), fourth (4) and eighth (8) control states are forcibly removed. The control state switches over to fifth (5), sixth (6), seventh (7) and ninth (9) control states through motor driving stop in the third control state (3). In addition, the special case control (special cases 1 and 2) does not switch over to the other special case control directly. Moreover, fifth (5), sixth (6), seventh (7) and ninth (9) control states after a switchover do not switch over to other control states until decontrol condition is satisfied. However, special case control (special case 3) switches over to control of special case 1, when a switchover condition of first control state (1) is satisfied, before a decontrol condition is satisfied.

Figure 8:
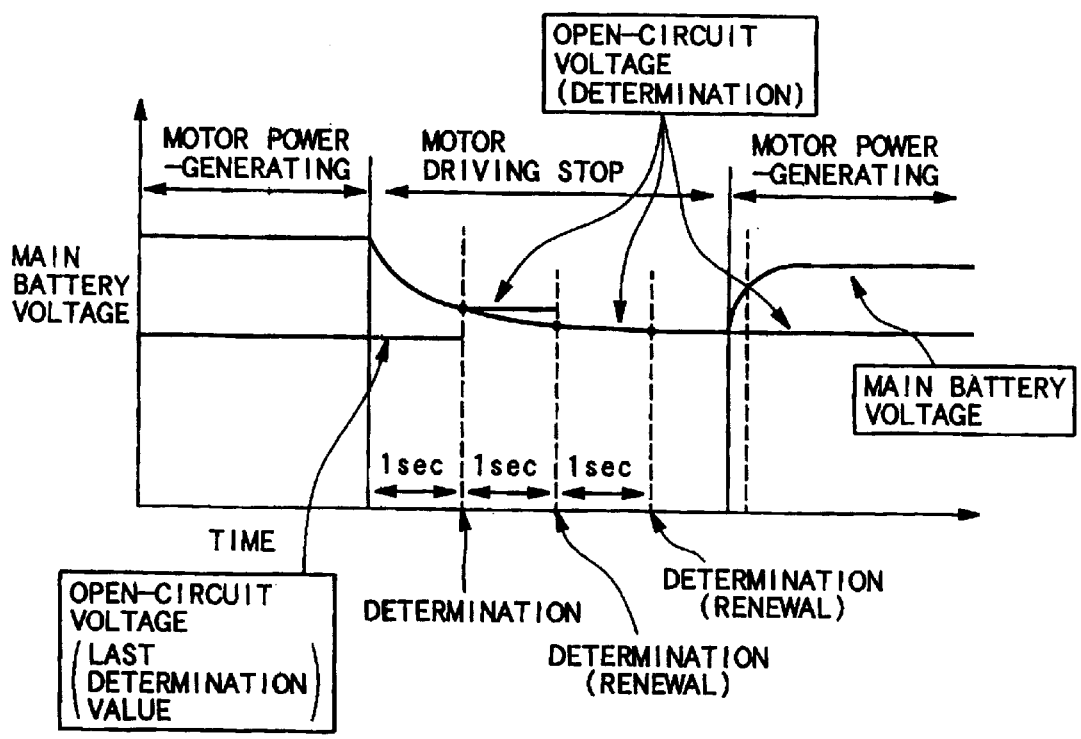
FIG. 8 is a time-chart showing processing to determine main battery open-circuit voltage at normal control mode.

The motor control means 26 detects the main battery open-circuit voltage of main battery 30 at driving stop of motor 4 (see FIG. 8). A normal control mode sets voltage parameters according to this main battery open-circuit voltage and an electric discharge control mode sets a value for a voltage parameter at a fixed value when the main battery open-circuit voltage is higher than a value at the normal control mode. Here, the main battery open-circuit voltage is the voltage of main battery 30 that was detected when both driving of motor 4 and generation driving stop were not operating. The normal control mode performs a constant control operation set (power-generation/drive) (see FIG. 4). The electric discharge control mode determines execution of control by a main battery open-circuit voltage state, and main battery 30 is used to give priority to an electric discharge (drive of motor 4) of main battery 30, but does not charge (see FIG. 5). The voltage parameters are upper/lower voltages; drive coefficient and power generation coefficient (see FIGS. 9–12). When a value of a voltage parameter becomes a fixed value, then a value of various voltage parameters is determined (see FIG. 2).

Moreover, in the motor control means 26, switchover condition from a normal control mode to an electric discharge control mode occurs when the main battery open-circuit voltage satisfies a first setting condition. Here, the condition when the first main battery open-circuit voltage satisfies a first setting is as follows. In every fixed time (1000 msec) continuation, a determined value of the main battery open-circuit voltage is equal to or more than the set or determined voltage (202V), and a number of counts must be counted to continue until a set counter counts ten consecutive times (see FIG. 4).

Furthermore, in motor control means 26, switchover conditions from an electric discharge control mode to normal control mode is executed when the voltage of main battery 30 satisfies either of second and third setting conditions. Here, the condition when the voltage of main battery 30 satisfies a second setting condition is as follows. The voltage of main battery 30 in driving of motor 4 is a state equal to or less than the lower voltage (185V) (see FIG. 5). In addition, the condition when the voltage of main battery 30 satisfies a third setting condition is as follows. At every fixed time (1000 msec) of voltage sensing, a determined value of the main battery open-circuit voltage is less than the set voltage (197V), and the number of counts must be counted consecutively until a set counter (seven times) is reached (see FIG. 6).

Figure 3:
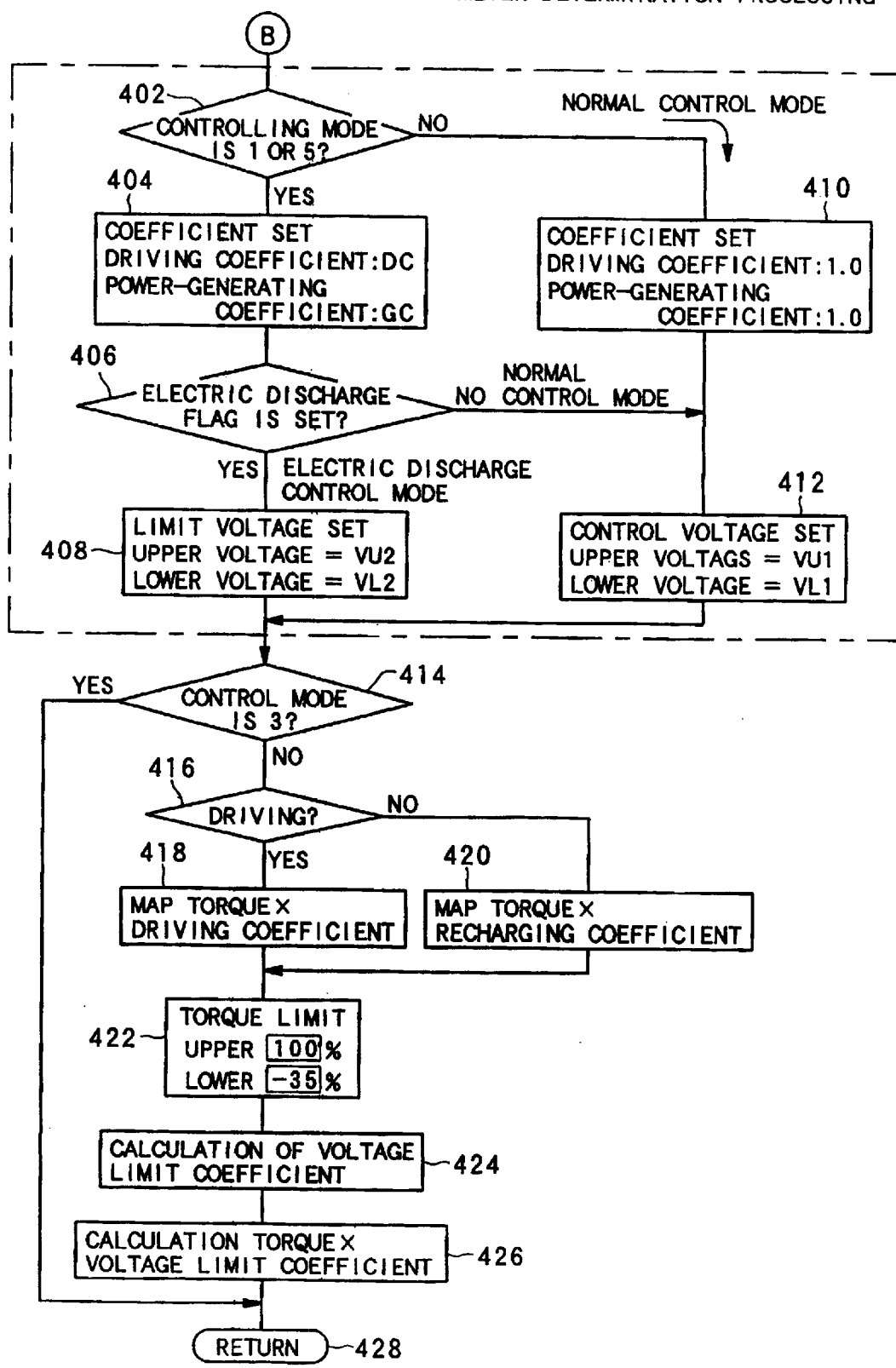
FIG. 3 is a control flowchart to determine main battery administering parameters.

Moreover, motor control means 26 controls an electric discharge control mode so as to at least assist acceleration (see FIG. 3: mode 5).

Moreover, the motor control means 26 sets a descent flag if the voltage of main battery 30 is less than the lower voltage during an electric discharge control mode. When the descent flag is set, then the motor control means 26 does not perform a determination as to whether an electric discharge control mode can execute (see FIG. 5).

Operation of the embodiment will now be described with reference to a control flowchart of normal control mode of a main battery administration control mode in FIG. 7 for use in the control apparatus.

Figure 7:
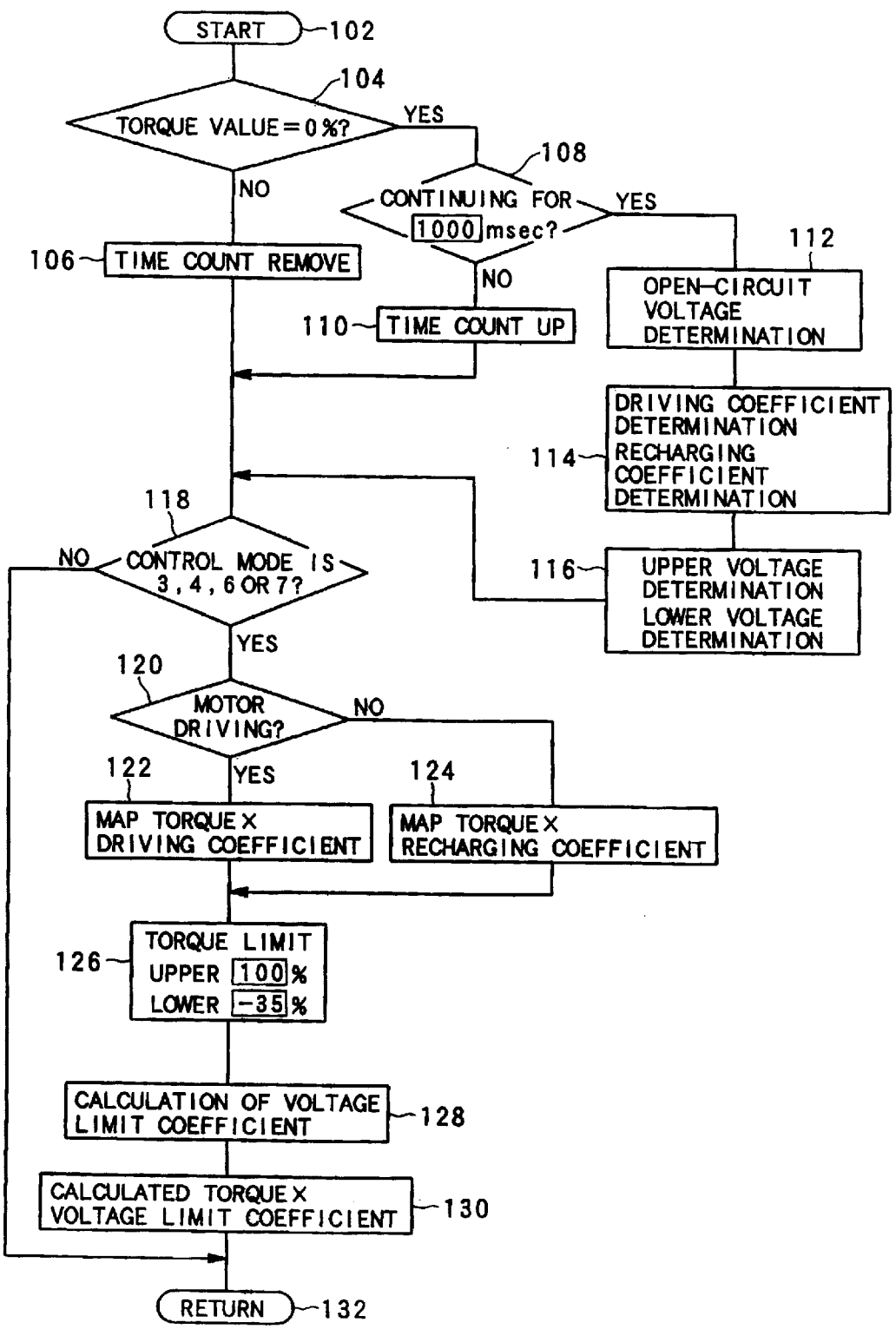
FIG. 7 is a control flowchart for normal control mode.

As shown in FIG. 7, a normal control mode starts control at step 102. Then search of a map is executed, and a determination is made at step 104 as to whether "torque value or order=0%". Here, "torque order=0%" means that driving of motor 4 is stopped (see FIGS. 4 and 5).

When the determination in step 104 is "NO" and "torque order≠0%", then count of constant time period (1000 ms) is removed (restarted) at step 106. Here, torque order≠0% means that driving of motor 4 is executed (driving or power-generation) (see FIGS. 4 and 5).

When the determination in step 104 is "YES" and "torque value=0%", then a determination is made at step 108 as to whether a constant time period of 1000 msec is continued.

When the determination in step 108 is "NO", then the count of constant time period is continued at step 110.

When the determination in step 108 is "YES", then main battery open-circuit voltage is determined at step 112. Therewith, a driving coefficient and recharging coefficient are determined at step 114 by searching each table (see FIGS. 9 and 10). In addition, both upper and lower voltages are determined at step 116 by searching each table (see FIGS. 11 and 12).

After previous steps 106, 110 and 116, a determination is made at step 118 as to whether the control mode is one of modes 3, 4, 6 or 7.

When the determination in step 118 is "NO", then a determination is made at step 120 whether the motor 4 is driven.

When the determination in step 120 is "YES", then calculation of "map torque×drive coefficient" is executed at step 122. If the determination in step 120 is "NO", then calculation of "map torque×recharging coefficient" is executed at step 124.

After the determination in steps 122 and 124 have been completed, processing of torque limit is performed, and a calculated torque value is obtained at step 126.

After the determination in step 126 has been completed, a voltage limit coefficient is calculated at step 128.

Therewith, processing of the equation, "calculated torque×voltage limit coefficient" is performed at step 130.

After the determination in step 130 have been completed, and when the determination in step 118 results in "YES", the routine is returned to step 132.

Now a normal control mode for the main battery administration control mode is explained in detail.

A basic operation of main battery voltage administration control in normal control mode has the following first to sixth items. In the first, the main battery open-circuit voltage of main battery 30 at motor driving stop is detected. For example, a determination is made whether the main battery open-circuit voltage is a controlling determined value (197V). Thus, a controlling decision value (197V) is detected. In the second item, the upper limit voltage in motor driving by the controlling determined value (197V) is set. For example, the upper limit voltage (210V) at motor driving is determined from an upper limit voltage search table value (see FIG. 12). In the third item, the lower voltage is set by the controlling value (197V). For example, the lower voltage at motor driving is set in 180V. The set lower voltage (180V) is determined by a lower voltage search table value (see FIG. 13). In the fourth item, a torque order limit coefficient is set by the controlling determined value (197V). For example, the driving torque order limit coefficient is set at 0.8. The set driving torque order or value limit coefficient (0.8) is determined for a driving limit coefficient search table value (see FIG. 9). Moreover, a power-generating torque order limit coefficient is set at 1.5. The set power-generating torque value limit coefficient (1.5) is determined as a power-generating limit coefficient search table value (see FIG. 10). In the fifth item, at start of motor driving, the motor is driven by the torque value or order that is executed by a revision of the motor driving limit performed from the procedure of the second, third and fourth items as a basic operation. In the sixth item, in case of a motor driving stop, the system returns to the first item that is a first procedure of basic operation. Using the above-mentioned first to sixth items as basic operation, administration of a main battery 30 is executed. It is assumed that the first to fourth items are executed each time a value for the main battery open-circuit voltage is determined (fixed). In a motor drive stopping state, it is assumed that the procedure of the first to fourth items is executed repeatedly.

In detection of the main battery open-circuit voltage, as mentioned above, a recharge/electric discharge of main battery 30 is limited by the main battery voltage. The main battery open-circuit voltage is the basis for control. When the main battery voltage is provided to the control means, control values (each limit value) change greatly in discontinuity, because the main battery voltage at motor driving has a tendency to be remarkably affected by factors such as driving outputs, internal resistance, battery temperature, electric discharge depth and so on. Then, the control does not converge and can possibly become unstable. Accordingly, it was assumed that only the main battery open-circuit voltage provided control.

As the main battery open-circuit voltage becomes a transitional state just after motor drive begins, a reply speed of control may be lowered (namely "gradual state"). In order to improve and stabilize the convergence, procedures for detection of the main battery open-circuit voltage to determination of controlling open-circuit voltage are as follows.

In detection and determination of a main battery open-circuit voltage, the main battery voltage is detected by sampling plus A/D (analog/digital) conversion. Processing for determining the main battery open-circuit voltage is performed at motor driving stop when a torque value is 0%.

In addition, processing to determine main battery open-circuit voltage, if a motor driving stop state has continued 1000 msec (ROM setting value), is determined and then a main battery open-circuit voltage is detected. When the main battery open-circuit voltage is determined, the above-mentioned procedures (2) to (4) are executed, and each control value is set. In addition, after procedures (2) to (4) (setting limit value) have been finished, when a motor driving stopping state continues, as shown in FIG. 3, then a continuation time is counted again and an update of main battery open-circuit voltage (a determined value) is repeated.

Furthermore, after the above-mentioned main battery open-circuit voltage is determined, a torque value limit coefficient is set by the main battery open-circuit voltage determined value. This torque value limit coefficient is set for a driving torque value limit coefficient at motor driving and a power-generating or recharging torque value limit coefficient at motor power-generation, respectively.

A driving torque value limit coefficient, as shown in FIG. 9, is set by a table constituted so as to search by main battery open-circuit voltage. In this case, a torque final value is obtained by the following equation (torque search value in each mode+water temperature revision)×(a limit coefficient at driving)≧100%". In addition, a power-generation driving torque value limit coefficient, as shown in FIG. 10, is set by a table constituted so as to search by main battery open-circuit voltage. In this case, a torque final value is obtained by the following equation: (torque search value in each mode+water temperature revision)×(power-generating or recharging limit coefficient)≧−35%. This equation means only 35% of the motor output (a torque) and mark "−(minus)" indicates the power-generation side.

In a revision of torque value limit, by using each table in FIGS. 9 and 10, a revision calculation of torque value is performed as follows after both a driving and a power-generating drive torque value limit coefficient are set.

In motor driving, the revision of torque value is performed by the following equation: A final torque value=(search map torque value+water temperature revision)×limit coefficient at driving". A calculated final torque value satisfies the following equation, and driving is executed from the calculation value calculated: Final torque value (drive)≦100% (torque value or order upper limit guard: ROM setting value). In power-generation driving, the revision of torque value is performed by the following equation: A torque final value=(search map torque value +water temperature revision)×limit coefficient at driving. A calculated final torque value satisfies the following equation, and power-generation driving is executed from the calculation value: Final torque value (power-generation)≧−35% (torque value lower limit guard: ROM setting value).

Figures 11, 12, 13:
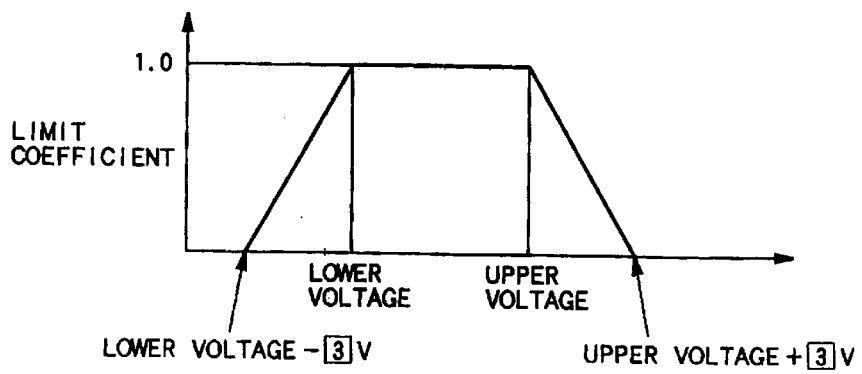
FIG. 11 is a diagram of a search table representing upper voltages.
FIG. 12 is a diagram of a search table representing lower voltages.
FIG. 13 is a diagram showing upper and lower voltage limit coefficients.

After a main battery open-circuit voltage is determined, both the upper and lower limit-determining voltages at motor driving (at driving/power-generating) are set so as to limit voltage at motor driving by the determined value. After a revision calculation of a torque value limit, both of upper and lower voltage limits are executed at the final torque value. The setting upper voltage limit, as shown in FIG. 11, is based on an upper voltage table constituted to search by determined values of a main battery open-circuit voltage. The setting lower voltage limit, as shown in FIG. 12, is based on a lower voltage table constituted to search by determined values of a main battery open-circuit voltage.

In the revision of voltage limit, both upper and lower limit-determining voltage coefficients, as shown in FIG. 13, are set. By both the set upper and the lower limit-determining voltage coefficient, a revision of torque value is executed as follows.

Hence, the revision of torque order is executed by the following equation: "Final torque value (voltage limit)=final torque value (power-generation or drive)×(power-generating limit coefficient)".

By this method, in normal control mode, the set control operation is executed, and various voltage parameters set.

Operation of the embodiment will now be described with reference to a FIG. 1 flowchart for determining a control state for an electric discharge control mode of a main battery administering control mode. Processing to determine the control state is executed every time the main battery open-circuit voltage is measured, and can set an electric discharge flag.

As shown in FIG. 1, a program for determining a control state for an electric discharge control mode begins control at step 202. Then a determination is made at step 204 whether an equation "torque value=0" is satisfied by a search map. When the determination in step 204 results in "YES", then a determination is made at step 206 as to whether the state of "YES" continues 1000 msec.

When the determination in step 206 is "YES", then a main battery open-circuit voltage is determined at step 208, and a determination is made at step 210 as to whether an electric discharge flag is set. Here, the electric discharge is a control state flag to set the control apparatus to an electric discharge control mode.

When the determination in step 210 is "NO", and when in a normal control mode, the equation of "main battery open-circuit voltage≧202V" is determined at step 212.

When the determination in step 212 is "YES", then counter A counts a number of times at step 214, and a determination is made at step 216 as to whether the equation "counter A=10" is satisfied. Here, the counter A is an electric charge control mode switchover-determining counter.

When the determination at step 216 is "YES", then an electric discharge flag is set at step 218, and the counter A is cleared (initialization) at step 220.

When the determination in step 212 is "NO", then therewith the counter A is cleared at step 222. When the determination in step 210 is "YES", and the control apparatus is in electric discharge control mode, then a determination is made at step 224 if the equation "main battery open-circuit voltage<control determined value (197V)" is satisfied.

When the determination in step 224 is "YES", then counter B counts the number of consecutive times counter B is incremented at step 226, and a determination is made at step 228 as to whether the equation "counter B=7" is satisfied. Here, the counter B is an electric discharge control mode removal-determining counter.

When the determination in step 228 is "YES", then the electric discharge flag is cleared at step 230, and counter B is cleared at step 232. Clearing the electric discharge flag returns the control means to the normal control mode. When the determination in step 224 is "NO",then counter B is cleared at step 234.

Incidentally, when the determination in previous step 204 is "NO",and when the equation "torque order≠0%" is satisfied, then the count of constant time period is removed at step 236. Then both counters A and B are cleared at step 238.

When the determination at step 206 is "NO", then the count of a time period is continued or incremented at step 240, and a determination is made at step 242 as to whether a descent flag is set. Here, the descent flag is an electric discharge control mode lower voltage descent history flag.

When the determination in step 242 is "YES" and the descent flag is set, the electric discharge flag is cleared, and the descent flag is cleared. Moreover, counter B is cleared, respectively, at step 244.

In the electric discharge control mode in FIG. 1, by existence of voltage descent to less than a lower voltage for the discharge electricity control mode during motor drive running, it is necessary to set a descent flag in order to reflect a determination of the above-mentioned control mode. Further, if the main battery voltage becomes equal to or less than the lower voltage and a descent flag is set, the routine does not switch over to electric discharge control mode. Furthermore, when the control switches over from a state where a torque order or value is set (final torque value≠0%) to a state without a torque value (final torque value=0%), then existence of the state of descent flag is always checked.

Figure 2:
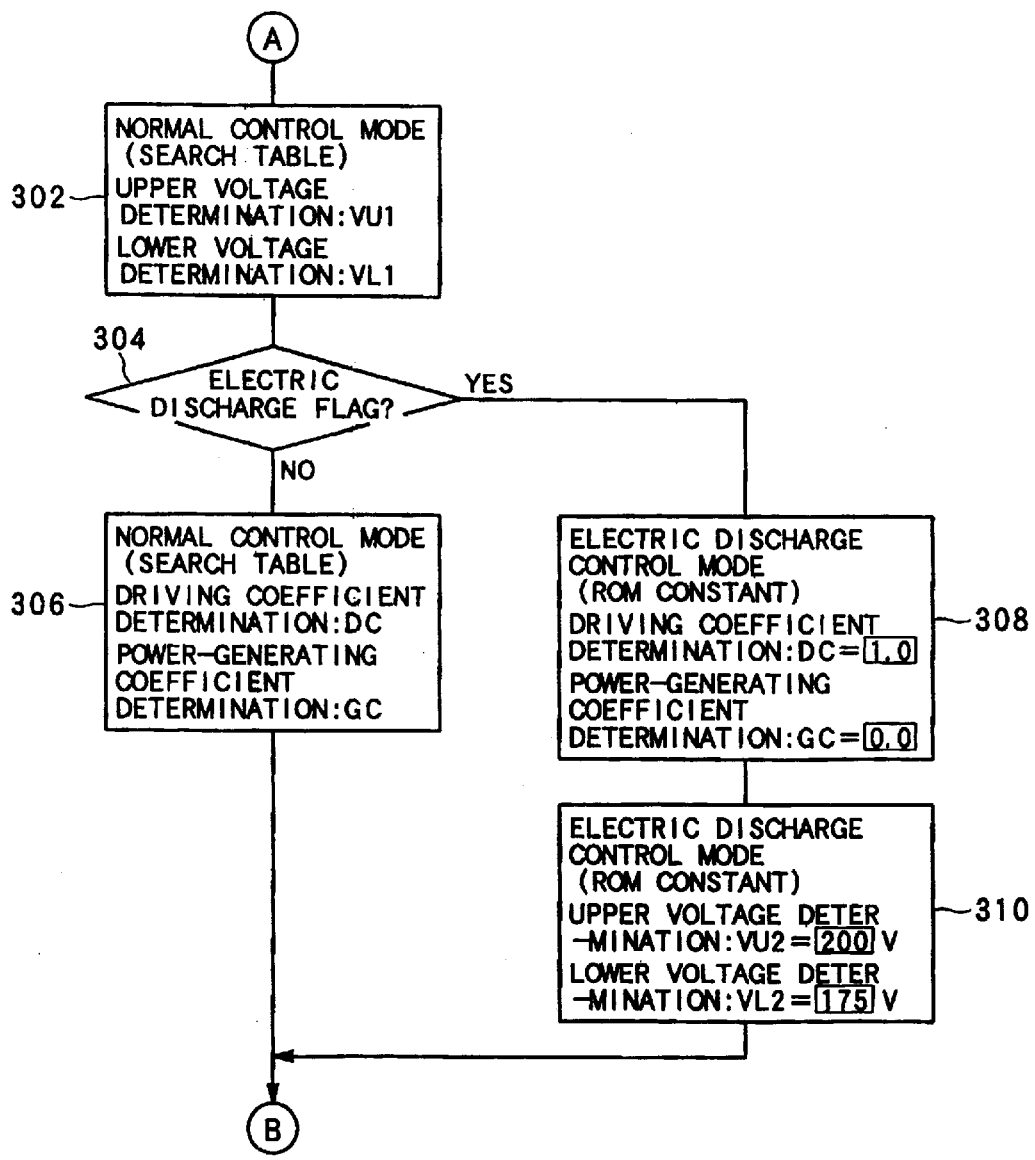
FIG. 2 is a control flowchart to determine main battery administering parameters for an electric discharge control mode.

When the determination in previous step 216 is "NO", and after previous steps 220 and 222, moreover, when the determination in previous step 228 is "NO",and after previous steps 232 and 234, processing to determine main battery administration parameters is performed based on the flowchart of FIG. 2. Processing to determine the main battery administration parameters is executed for every determination of main battery open-circuit voltage in order to set values for various voltage parameters as fixed values.

In FIG. 2, upper limit voltage (VU1) and lower voltage (VL1) of main battery 30 is determined at step 302 for normal control mode (search of each table). Next, a determination is made at step 304 as to whether the electric discharge flag is set.

When the determination in step 304 is "NO", and when being in normal control mode, both a driving (DC) and power-generating coefficient (GC) is determined at step 306 in normal control mode (search of each table).

When the determination in step 304 is "YES", then the apparatus is in an electric discharge mode. The driving coefficient is determined for 1.0 and the power-generating coefficient is determined for 0.0, at step 308, in the electric discharge control mode (constant of ROM), respectively. Thus power generating will not occur.

In the electric discharge control mode (constant of ROM), upper voltage limit (VU2) is determined as 200V and the lower voltage limit VL2 is determined as 175V, at step 310.

After both steps 306 and 310, and after a previous step, when the determination in step 242 is "NO", and when the descent flag is not set, then processing to set main battery administration parameters in FIG. 3 is performed. The processing to set main battery administration parameters is executed every calculation of torque value.

In FIG. 3, a determination is made at step 402 as to whether control mode is "mode 1" or "mode 5". When the determination in step 402 is YES", then both driving (DC) and power-generating coefficients (GC) are set at step 404, and a determination is made at step 406 whether the electric discharge flag is set.

When the determination in step 406 is "YES", that the control means is in electric discharge mode, then both upper (VU2) and lower (VL2) limit voltages are set at step 408.

When the determination in step 402 is "NO", then control coefficient (DC) is set for 1.0 and power-generating coefficient (GC) is set for 1.0 at step 410.

After the determination in step 410, when the determination in step 406 is "NO", indicating normal control mode, both upper (VU1) and lower voltages (VL1) are set at step 412.

After the determination in steps 408 and 412, a determination is made at step 414 as to whether the control mode is in "mode 3". When the determination in 414 is "NO",then a determination is made at step 416 as to whether the electric motor is driving. When the determination in step 416 is "YES", then the equation of map torque×driving coefficient is calculated at step 418. When the determination in step 416 is "NO",then the equation of "map torque×recharging coefficient"is calculated at step 420.

After the determination in steps 418 and 420, processing of torque limit is performed, and a calculated torque value is obtained at step 422. After the determination in step 422, a voltage limit coefficient is calculated at step 424.

Processing of the equation "calculated torque value× voltage limit coefficient" is performed at step 426. After the determination in step 426, the program returns at step 428.

A detailed and concrete explanation of the electric discharge control mode of this main battery administrating control mode will be given of embodiments according to the invention in reference to the drawings as follows.

In the electric discharge mode, revision operation of torque value limit sets the torque value limit coefficient by a ROM set value of motor control means 26 regardless of the main battery voltage. Thus, the torque value limit coefficient for motor driving of an electric discharge control mode is set for 1.0, and the torque value limit coefficient for power-generation driving of an electric discharge control mode is set for 0.0. The revision operation for torque value is the same as in the normal control mode. In addition, torque limit of the final torque value is also the same in normal control mode.

In addition, revision operation of voltage limits sets both upper and lower voltages for motor driving by ROM set values of motor control means 26 regardless of the main battery voltage. Thus, the torque value limit coefficient for driving for the electric discharge control mode is set for 1.0, and the torque value limit coefficient for power-generation driving of the electric discharge control mode is set for 0.0. The revised operation of torque value is the same as normal control mode. In addition, torque limit of final torque value is also the same as in normal control mode.

In a switchover condition of the control mode, main battery administrating control in the normal control mode is a basic control state. But, when switchover condition is satisfied, then the control switches over to the electric discharge mode. Next, switchover condition of the controlling state in the normal control mode and the electric discharge control mode is explained.

Figure 4:
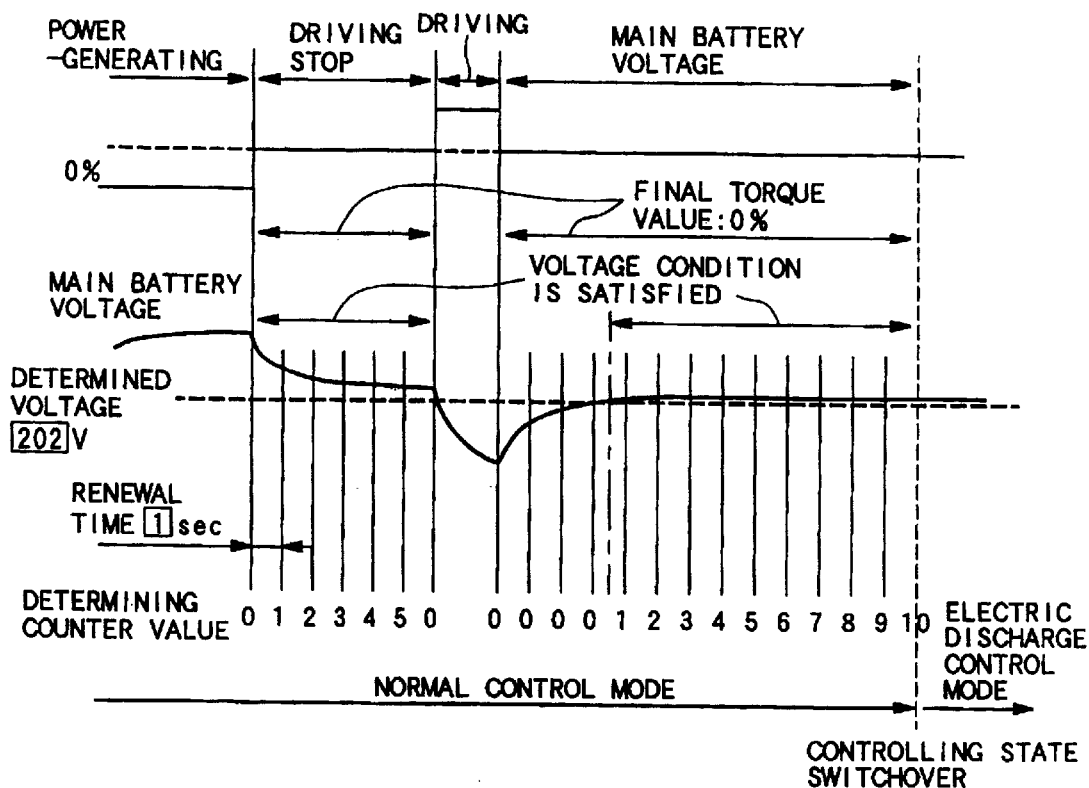
FIG. 4 is a time-chart switching over from normal control mode to electric discharge control mode.

In switchover conditions from normal control mode to electric discharge control mode, as shown in FIG. 4, by processing (every 1000 msec continuation) to determine main battery open-circuit voltage, a condition for determined value of main battery open-circuit voltage≧202V is decided. When the condition that the switchover determining voltage of the electric discharge control mode continues counting ten consecutive times is satisfied, then the control mode switches over from normal control mode to electric discharge control mode. In the abovementioned determination, the time counting (ten times) is executed in succession while a voltage condition is satisfied, but when motor driving (final torque value≠0%) is executed, the counter for time counting is cleared (counter=0: initializing determination). Therefore, at the next motor driving stop (final torque value=0%), the control starts from an initial state.

In removing the condition from electric discharge control mode to normal control mode during the discharge control mode, either of the following second and third setting conditions is satisfied.

Figure 5:
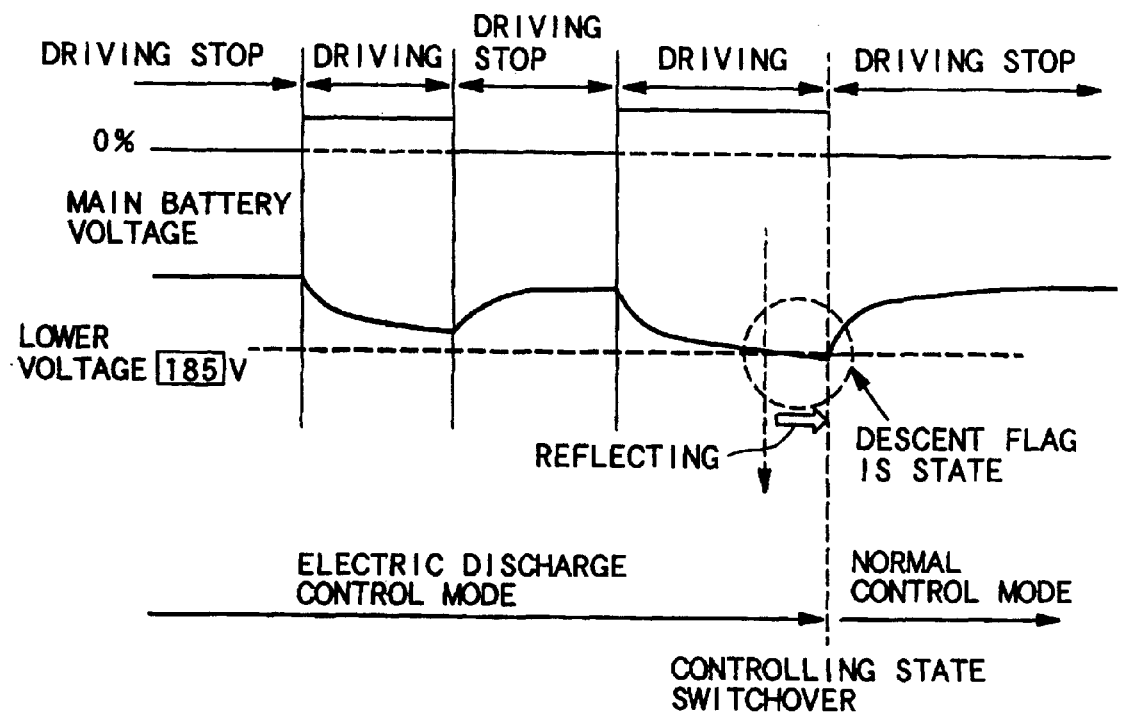
FIG. 5 is a time-chart switching over from electric discharge control mode to normal control mode.

The second setting condition for changing the control mode is considered. As shown in FIG. 5, main battery voltage is less than a lower limit voltage of electric discharge control mode during motor drive driving. Thus, the condition of main battery voltage during driving≦lower voltage of electric discharge control mode (185V) is determined, and when motor driving ends (when final torque value=0% is satisfied), then the electric discharge control mode is removed and is switched over to normal control mode. Then, voltage descent history to less than lower voltage is reflected at motor driving stop (final torque value=0%). In addition, this process is executed when in all motor control modes, the equation final torque value is satisfied. In addition, in FIG. 5, when voltage descent history is reflected at motor driving stop, a descent flag is a set.

Figure 6:
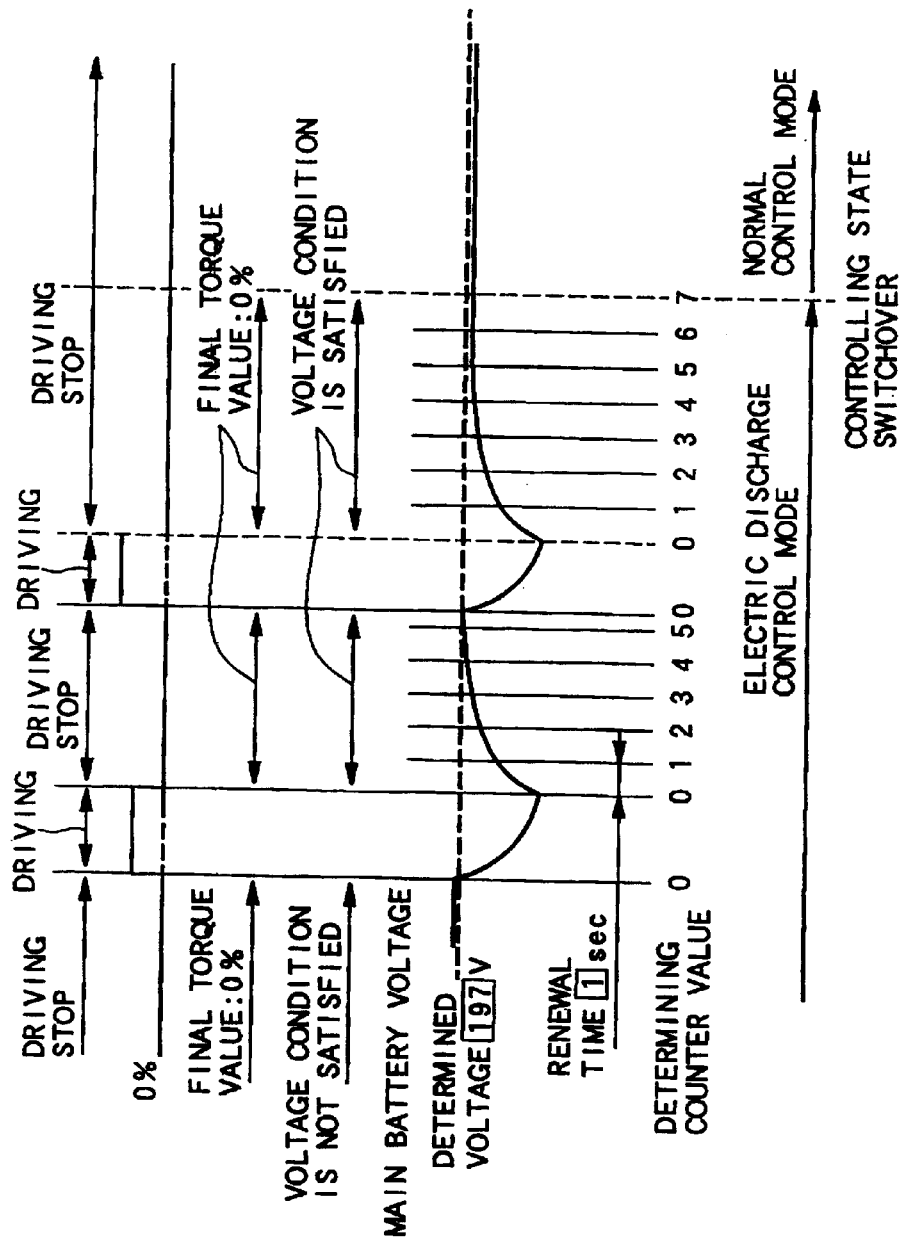
FIG. 6 is a time-chart showing processing to determine main battery open-circuit voltage for an electric discharge control mode.

The third setting condition for changing to the control mode is shown in FIG. 6. In processing (every 1000 msec continuation for a constant time period) to determine the above-mentioned main battery open-circuit voltage, the equation "determined value of main battery open-circuit voltage<controlling determined value (197)" is determined. When a condition that removal determining voltage from electric discharge control mode continues consecutively counting seven times is satisfied, the control mode switches over from the electric discharge control mode to normal control mode. In the abovementioned determination, the time counting (seven times) is executed in succession while a voltage condition is satisfied, but when motor driving (final torque value≠0%) was executed along the way, the counter for time counting is cleared (counter=0: initializing determination). Therefore, at next motor driving stop (final torque value=0%), the counter control starts from an initial state.

In a normal control mode and an electric discharge control mode, as a determination of switchover of control state is performed, processing for determining main battery open-circuit voltage (processing to update every 1000 msec for time period) is always executed at motor driving stop (final torque value=0%).

Therefore, in an embodiment of this invention, normal control mode and electric discharge control mode are set as main battery administrating control modes. When a main battery voltage state is good, main battery open-circuit voltage high, revision coefficients (driving revision coefficient and power-generating revision coefficient) that are a voltage parameter of the main battery administrating control and voltage limit value (both upper and lower limit voltages) are fixed in value to become an electric discharge tendency (giving priority to drive of motor 4) and a value. By driving motor 4 for an arbitrary time period (until performing electric discharge of a fixed quantity), the open-circuit voltage of main battery 30 (at stopping state of both electric motor driving/power-generating driving, together) is detected. According to a level of the main battery open-circuit voltage, by multiplying a search map value by a coefficient, drive torque/powered-generating torque is limited. In addition, a battery voltage lower value at motor driving is limited and the battery voltage upper limit value at motor powered-generating also is limited. It gives priority to some electric discharge by battery voltage state and uses main battery 30, namely, by adding the control mode of motor drive priority, fuel efficiency is improved, and driving performance is improved by letting a driver experience the effect of motor assist. Further, when the volume of main battery 30 has fallen to a fixed level, then the charge performs gradually. Accordingly, motor 4 functions so that an over-charge and over-electric discharge of main battery 30 is prevented. As a result, by reasonable charge and electric discharge, life of main battery 30 is extended. Furthermore, battery administration is performed by a simplified system of hardware and software.

Therefore, motor control means 26 has a normal control mode which detects the main battery open-circuit voltage of main battery 30 at driving stop of motor 4, and which sets voltage parameters according to this main battery open-circuit voltage. In addition, motor control means 26 also has an electric discharge control mode that sets a value for a battery voltage parameter to a fixed value when the main battery open-circuit voltage is higher than at normal control mode. Accordingly, voltage parameters are set at a value giving electric discharge tendency (giving priority to drive of motor 4), and when a battery state is good, the motor is driven only for a voluntary predetermined time period to provide an electric discharge of fixed quantity. As a result, fuel efficiency is improved, and driving performance is improved by letting the driver experience the effect of motor assist. In addition, over-charge and over-electric discharge of main battery 30 can be prevented. Accordingly, by reasonable charge and electric discharge, life of main battery 30 is extended.

Motor control means 26 determines a switchover from a normal control mode to an electric discharge control mode when main battery open-circuit voltage has satisfied the above-mentioned first setting condition. Therefore, when a value of main battery open-circuit voltage is stable and high, then the control mode shifts to an electric discharge control mode.

In the motor control means 26, switchover from an electric discharge control mode to normal control mode, during driving of motor 4, is executed when the voltage of the main battery 30 satisfies either condition of second or third setting conditions. Accordingly, two parameters of main battery voltage and main battery open-circuit voltage are watched in switchover from electric discharge control mode to normal control mode, and over-electric discharge of main battery 30 is prevented when either condition is satisfied.

The motor control means 26 uses an electric discharge control mode at least to assist acceleration. Accordingly, in all operating modes, an electric discharge control mode is only executed at a control state (an acceleration assist, a departure assist) of a necessary minimum. Thus, there is little influence to performance of main battery 30. This system can satisfy two elements, improvement of fuel efficiency and driving performance, as well as security of life of main battery 30, which are directly opposed concepts.

The motor control means 26 sets a descent flag if the voltage of main battery 30 is less than the lower voltage during electric discharge control modes. When the descent flag is set, then the motor control means 26 does not determine whether an electric discharge control mode can execute. Therefore, because electric discharge control mode is not executed when a state of main battery 30 is not good, it is possible to extend the life of main battery 30.

In this invention, the main battery uses a general lead storage battery, but a nickel/hydrogen battery or a lithium ion battery also may be utilized.

Moreover, the system predicts travel distance for a vehicle, and can drive a motor so as to lose a quantity of charge from a battery, and can execute a motor assist by effectively using the battery.

What is claimed is:

1. A control apparatus for a hybrid vehicle, including an electric motor directly connected to an internal combustion engine and having driving and power-generating functions, a main battery supplying a driving electric power to the electric motor and charged by power-generating electricity from the motor, and a motor controller having a normal control mode for detecting open-circuit voltage of said main battery at driving stop of said motor and setting voltage parameters according to said battery open-circuit voltage, said motor controller having an electric discharge control mode setting a value of said battery voltage parameter at a fixed value when said battery open-circuit voltage satisfies a first setting condition by having a voltage greater than the voltage at said normal control mode.

2. A control apparatus for a hybrid vehicle as defined in claim 1, wherein said motor controller in response to switchover conditions, switches from said normal control mode to said electric discharge control mode when said battery open-circuit voltage satisfies the first setting condition.

3. A control apparatus for a hybrid vehicle as defined in claim 1, wherein said controller, in response to switchover conditions, switches from said electric discharge control mode to said normal control mode for driving of said motor when the voltage of said battery satisfies either condition of second or third setting conditions.

4. A control apparatus for a hybrid vehicle as defined in claim 1, wherein said motor controller controls said electric discharge control mode at least for an acceleration assist of said engine.

5. A control apparatus for a hybrid vehicle as defined in claim 1, wherein, when voltage of said battery is less than a lower voltage during said electric discharge control mode, said motor controller sets a descent flag and said motor controller does not perform a determination as to whether to execute said electric discharge control mode.

* * * * *